April 4, 1961 K. L. WINSOR 2,978,653

FREQUENCY MODULATED DUAL FEEDBACK PHASE SHIFT OSCILLATOR

Filed Oct. 8, 1958

4 Sheets-Sheet 1

INVENTOR.
KEITH L. WINSOR

BY Reed C. Lawlor

ATTORNEY

INVENTOR.
KEITH L. WINSOR
BY
[signature]
ATTORNEY

April 4, 1961 K. L. WINSOR 2,978,653

FREQUENCY MODULATED DUAL FEEDBACK PHASE SHIFT OSCILLATOR

Filed Oct. 8, 1958

4 Sheets-Sheet 3

INVENTOR.
KEITH L. WINSOR

BY [signature]

ATTORNEY

INVENTOR.
KEITH L. WINSOR
BY
Reed Lawlor
ATTORNEY 2,978,653

FREQUENCY MODULATED DUAL FEEDBACK PHASE SHIFT OSCILLATOR

Keith L. Winsor, Pasadena, Calif., assignor, by mesne assignments, to Daystrom, Incorporated, Murray Hill, N.J., a corporation of New Jersey Filed Oct. 8, 1958, Ser. No. 766,131

11 Claims. (Cl. 332—22)

This invention relates to improvements in frequency modulated oscillators of the phase-shift type, and more particularly to improvements in frequency modulated oscillators that employ two feedback paths between the output and the input of a common amplifier and in which the signal that is fed back in one path forms a large electrical angle with that fed back in the other path and in which the amplitude of the signal fed back in one of the paths is modulated in accordance with the amplitude of a control force supplied from an external source.

Frequency modulated oscillators of the type to which this invention is particularly applicable are disclosed in the co-pending patent application of Thomas H. Wiancko and Keith L. Winsor, filed December 30, 1957 under Serial No. 705,891. Oscillators of the general type to which this invention is applicable are also disclosed in U.S. Patent No. 2,814,020 issued to Bowman et al., and in British Patent No. 759,573, issued to Bendix Aviation, October 17, 1956. Though the invention is applicable to many such oscillators, it will be described hereinafter with reference to the specific type of oscillator described and claimed in said co-pending Wiancko et al. application.

In a frequency modulated oscillator of the type to which this invention is applicable, a main amplifier channel is employed, together with two feedback circuits. One of the feedback circuits is hereinafter referred to as the main or reference feedback circuit. This feedback circuit includes a first phase-shift network, usually one in which the signal fed back through the main feedback circuit is of substantially constant amplitude. The other feedback circuit is referred to hereinafter as the modulating, or auxiliary, feedback circuit. This feedback circuit includes a second phase-shift network. The auxiliary feedback circuit also includes an amplitude modulator that is controlled by a control force such as a signal voltage supplied by a signal source in such a way as to vary the magnitude of the voltage fed back through the auxiliary feedback circuit in accordance with the magnitude of the control force. The two phase shift networks are so designed that the signal fed back through the second feedback circuit forms a large electrical angle relative to the signal fed back through the first phase shift network.

In such an oscillator, the frequency of oscillation adjusts itself automatically to a frequency at which the two signals fed back through the two feedback circuits when combined and applied to the input of the amplifier then produce an amplified signal at the output of the amplifier which is in phase with the signal originally applied to the two feedback circuits from the output of the amplifier. With such a circuit, the deviation of the frequency of the oscillator from some standard, or normal, value can be made approximately proportional to the amplitude of the signals applied from the signal source. In practice, a very high degree of linearity of frequency deviation in terms of the applied control force can be achieved. However, the output frequency is never a perfectly linear function of the applied signal voltage.

In fact, it is found experimentally that when the constants of such circuit are adjusted to produce a most nearly linear characteristic, the output frequency deviates from a simple linear or straight-line function of the applied signal voltage in one direction in part of the amplitude range and in the opposite direction in the remainder of the amplitude range. As a matter of fact, if one graphs the deviation of the output frequency as a function of control force from a simple linear function, a sinuous or S-shaped curve is obtained. Thus, as illustrated in Fig. 1, the line A represents how the frequency of the output would vary in a particular case as a function of an input voltage $V_1$ if the output frequency were a perfectly linear function of the input voltage. And curve B represents a plot of the actual results obtained in an oscillator of the type described. Here it will be noted that in the lower half of the voltage range, the deviation of curve B from curve A is in a negative direction, whereas in the upper half of the voltage range the deviation of curve B from curve A is in a positive direction. The actual center C or crossover point where the two graphs intersect, can be adjusted somewhat by varying some of the circuit constants in the feedback circuits. In any event, however, a characteristic can be obtained in which the center point C of curve B is about midway between the ends of the curve which correspond to the maximum and minimum voltages of interest in a particular range.

It will be noted that in the case illustrated in Fig. 1, three points X, Y and Z of the curve B lie on a straight line. For convenience, the frequency corresponding to point X is called the lower-limit frequency $f_l$ and the frequency corresponding to point Z is called the upper-limit frequency $f_u$, while the frequency corresponding to point Y is called the intermediate-frequency $f_c$. In fact, the lower-limit frequency represented at point X corresponds to one extreme value of input signal, such as 0 volt, while the upper-limit frequency corresponding to point Z corresponds to the other limit of input voltage, such as 5.0 volts. The limits of input signal referred to are the extreme values of the range of input signal for which the oscillator is designed to be normally used. The intermediate-frequency is centered and corresponds to the center value of the input signal range, in this case, 2.5 volts. When a circuit has been adjusted to cause the three points X, Y and Z to be equally spaced along the line, this is referred to as centered "three-point linearity," even though some degree of S-curve nonlinearity is present.

In this application, the term "linearity error" is defined as the ratio of the maximum frequency deviation from a perfectly linear function divided by the difference between the lower-limit and upper-limit frequencies. Thus, for example, in the case of Fig. 1, the linearity error is defined as follows:

$$\text{linearity error} = \frac{\Delta f_D}{f_u - f_l}$$

I have found that the linearity of a frequency modulated oscillator of the type described can be greatly improved, that is, the linearity error can be reduced, by simply inserting an appropriate amplitude-discriminatory filter, or in other words, an attenuation network, in the auxiliary feedback circuit. Ideally, the inserted attenuation network should possess no phase-shift characteristic. However, if it does possess a phase-shift characteristic in which the phase shift introduced by it varies with frequency, satisfactory results can still be obtained, especially if this phase shift is small. The attenuation network is a band-pass filter or a band-suppression filter, depending upon the nature of the S-curve that is to be reduced or eliminated. Thus, for example, if the S-curve is of the type represented by the graph B' of Fig. 2 in which the deviations from linearity are of opposite sign from those in Fig. 1, a band-suppression attenuation network is employed. But if the S-curve is of the type shown in Fig. 1, a band-pass attenuation network is employed.

Specific examples of a circuit constructed in accordance with this invention and some modifications thereof, are illustrated in the accompanying drawings and are described below.

Figures 3, 4, 5:
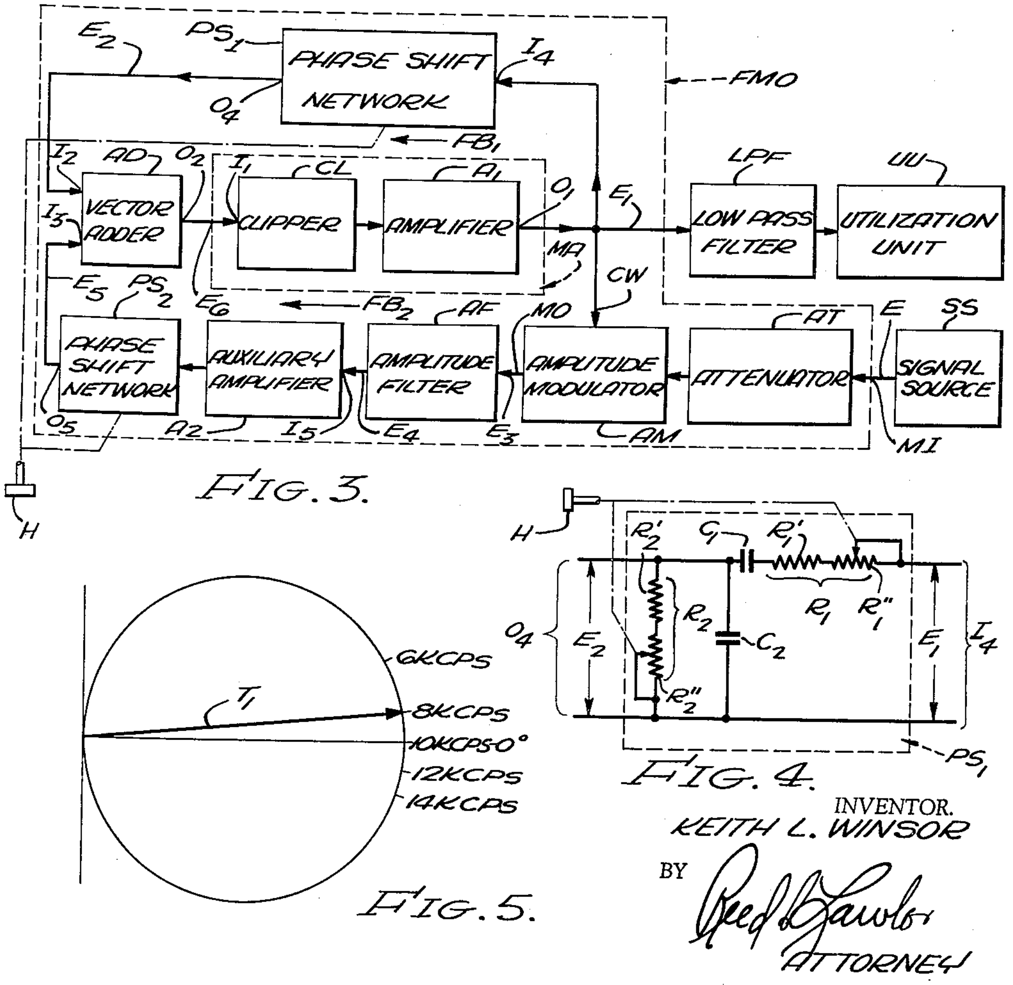
Fig. 3 is a block diagram of a frequency modulated oscillator embodying this invention.
Fig. 4 is a wiring diagram of a phase-shift circuit employed in this invention.
Fig. 5 is a polar diagram of the characteristic of the phase-shift circuit of Fig. 4.

Referring to the drawings, and more particularly to Fig. 3, there is shown a frequency-modulated oscillator of the type described in the above-identified co-pending Wiancko et al. patent application but modified to produce a more nearly linear output in accordance with this invention. The frequency modulated oscillator FMO of Fig. 3 has an input MI to which signal voltages originating in a signal source SS are applied and having an output OP at which frequency modulated signals are produced and from which such signals are transmitted through a low-pass filter LPF to a utilization unit UU.

The frequency modulated oscillator FMO of Fig. 3 employs a main amplifier channel MA which includes a clipper CL and a main amplifier $A_1$ connected in the order named between an input $I_1$ and an output $O_1$. The frequency modulated signal appearing in the output $O_1$ of the amplifier channel MA is fed back to the input $I_1$ of the amplifier channel MA by means of two feedback circuits, namely a main feedback circuit $FB_1$ and an auxiliary feedback circuit $FB_2$. The signals fed back are applied to two inputs $I_2$ and $I_3$ of a vector adder AD where they are combined vectorially, and the combined or resultant signal is applied to the input $I_1$ of the main amplifier channel. In such a system, oscillation occurs when the resutlant voltage produced at the output $O_2$ of the adder AD differs in phase from the voltage appearing at the output $O_1$ of the amplifier channel MA by an amount which equals the phase shift that would occur when a signal of that same frequency is transmitted through the amplifier channel MA. More particularly, when the amplifier channel $A_1$ has a zero phase-shift characteristic, oscillation occurs when the resultant voltage produced at the output $O_2$ of the adder AD is in phase with the voltage appearing at the output $O_1$ of the amplifier channel MA.

The first feedback circuit $FB_1$ is formed by a first or main phase shift network $PS_1$ that is connected between the amplifier channel output $O_1$ and the input $I_2$ of the adder AD. The second feedback circuit $FB_2$ of this invention includes four parts connected in sequence between the output $O_1$ of the amplifier channel MA and the input $I_3$ of the adder AD. The four parts are, a second or auxiliary phase-shift network $PS_2$, an auxiliary or feedback amplifier $A_2$, a balanced amplitude modulator AM that is responsive to an external signal, and a band discriminating network or amplitude filter AF. In the specific form of the invention shown, the amplitude filter AF is connected between the output MO of the amplitude modulator and the auxiliary feedback amplifier $A_2$ and the second phase-shift network $PS_2$ is connected between the output of the auxiliary amplifier $A_2$ and the input $I_3$ of the adder AD. Also, the carrier wave input CW of the amplitude modulator AM is connected to the output $O_1$ of the main amplifier channel MA.

In this invention an attenuation network is employed to improve the linearity of the oscillator. This improvement results very largely from the use of an attenuation network that has characteristics that are especially related to those of the remaining elements of the oscillator. A band-discriminating network has been found to be most suitable since such circuits usually introduce little phase shift. However even after inserting the band-discriminating network the characteristics of the elements previously present are modified somewhat. For this reason and because it is so difficult to design the elements and the attenuation network to have the optimum characteristics, some of such elements and the attenuation network are made adjustable and the final characteristics of the oscillator are frequently attained by manipulation of these adjustable elements.

As more fully explained hereinafter, the amplitude modulator AM is of a type which produces no signal at its output MO, when the voltage applied from the signal source SS has a center value. For example, in a specific embodiment of the invention, the system was designed to handle a range of input voltages from a signal source SS between 0 volt and 5 volts. In this case the amplitude modulator AM was designed to produce no signal at its output MO when the input voltage E was 2.5 volts. In one such case, the oscillator was designed to produce an output signal which had a center frequency of 10,000 c.p.s. when the input voltage was 2.5 volts and was designed to vary between limits of 6,000 c.p.s. and 14,000 c.p.s. as the input signal voltage varied from zero volt to 5 volts. In that particular system, the percentage modulation of the frequency modulated signal was very high, namely, $\pm 40\%$.

The characteristics of the various parts of that system will now be described both in a qualitative way and to a sufficient accuracy to enable those skilled in the art of electronic circuits to understand and practice the invention.

Each of the two amplifiers $A_1$ and $A_2$ is of the negative feedback type, that is, each of them had a uniform amplification and very little phase shift over the frequency range at which they were to be operated. At the center frequency, for example, the phase shift was less than one degree. The voltage gain of amplifier $A_1$ is relatively low, being about 5, and the voltage gain of amplifier $A_2$ is relatively high, being about 150.

The prase shift network $PS_1$ is of the type illustrated in Fig. 4. The transmission characteristic of that network is illustrated in the polar diagram of Fig. 5. Here it will be noted that in the particular network zero phase shift occurred at the center frequency of 10,000 c.p.s. The length of the vector $T_1$ of this diagram represents the ratio of the voltage $E_2$ appearing at the output $O_4$ of the phase-shift network $PS_1$ and the voltage $E_1$ impressed on its input $I_4$, thus $$T_1=\frac{E_2}{E_1}$$

The first phase-shift network is a Wien bridge. It may also be looked upon as a ladder network in which the series arm consists of a resistor $R_1$ and a capacitor $C_1$ connected in series and a shunt arm consisting of a resistor $R_2$ and a capacitor $C_2$ connected in parallel. The characteristics illustrated in the polar diagram of Fig. 5 correspond to those obtained when the values of these resistors and capacitors are as follows:

$R_1$=6.25 kω
$C_1$=2500 μμf.
$R_2$=12.5 kω
$C_2$=1250 μμf.

where kω means kilohms and μμf. means micro-microfarads.

Figure 6:
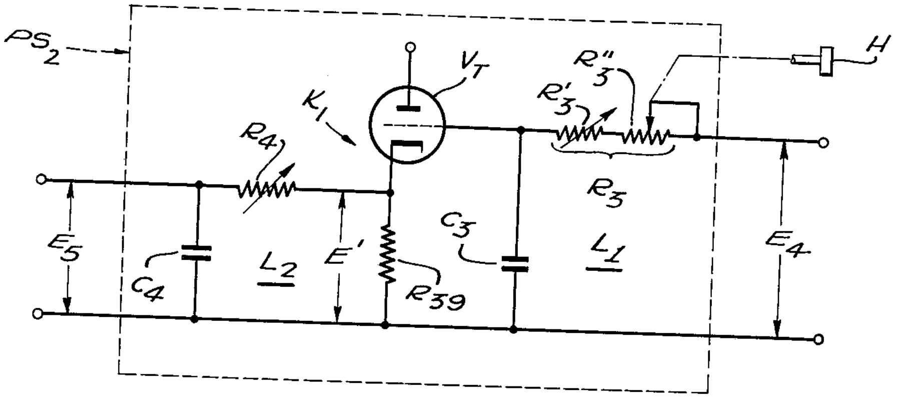
Fig. 6 is a wiring diagram of a second phase-shift circuit employed in this invention.
Figure 7:
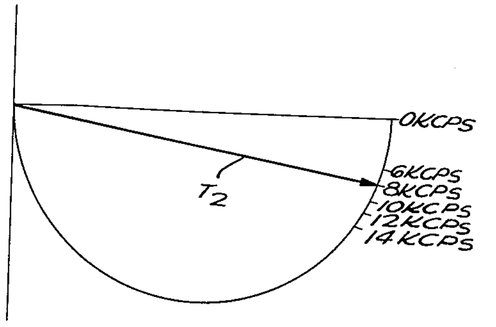
Figs. 7 and 8 are polar diagrams of the characteristics of parts of the circuit of Fig. 6.

The second phase-shift network $PS_2$ is of the type illustrated in Fig. 6. This network comprises two ladder sections $L_1$ and $L_2$ isolated from each other by a cathode follower amplifier section $K_1$. When the values of the components of the first ladder network had the values:

$R_3$=2.25 kω
$C_3$=1600 μμf.

this ladder network $L_1$ had a transmission coefficient $$T_2=\frac{E'}{E_4}$$

as indicated in the polar diagram of Fig. 7.

Figure 8:
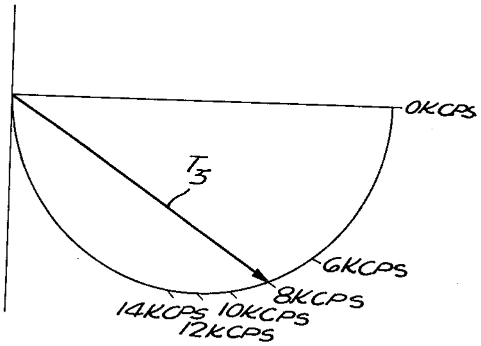

In a similar way, when the values of the components of the second ladder network $L_2$ were $R_4$=22.5 kω
$C_4$=591 μμf.

the transmission coefficient of the network was $$T_3=\frac{E_5}{E'}$$

as indicated in the polar diagram of Fig. 8.

Figure 9:
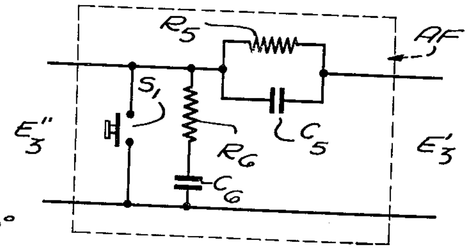
Fig. 9 is a wiring diagram of a band discriminating circuit employed in this invention.

A specific attenuation network AF which has been used in the practice of this invention is illustrated in Fig. 9. This network is also a Wien bridge. In this case, however, the series circuit consists of a resistor $R_5$ and a capacitor $C_5$ connected in parallel and the shunt circuit consists of a resistor $R_6$ and a capacitor $C_6$ connected in series.

Figure 10:
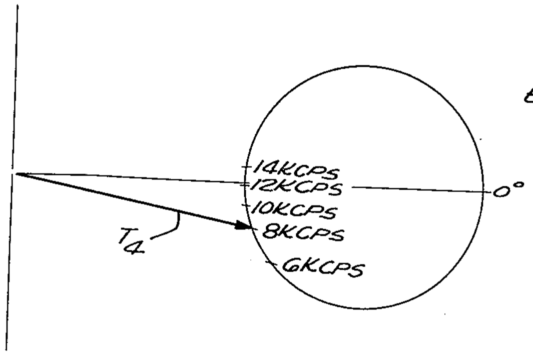
Fig. 10 is a polar diagram of the characteristics of the circuit illustrated in Fig. 9.

In this case when the circuit elements have the values:

$R_5$=10 kω
$C_5$=1300 μμf.
$R_6$=5 kω
$C_6$=2600 μμf.

the network AF had a transmission coefficient $$T_4=\frac{E_3''}{E_3'}$$

as represented in the polar diagram of Fig. 10. For best results it was found that the circuit elements of this circuit should be selected to have the values listed above so that the minimum value of transmission coefficient occurred at 12,000 c.p.s. and the values increased monotonically on each side thereof.

The balanced amplitude modulator $MA_5$ is of a type described in detail in said co-pending Waincko et al. patent application, Serial No. 705,891. As mentioned previously, the signal supplied by the signal source SS to the amplitude modulator AM causes the signal appearing at the output of the amplitude modulator to vary as a nearly linear function of the amplitude of the applied signal. When the amplitude of the modulating voltage E is positive, the voltage $E_2$ leads the voltage $E_5$ and the frequency deviation $\Delta f$ is positive, but when the amplitude of the modulating voltage E is negative, the frequency deviation $\Delta f$ is negative and the voltage $E_2$ lags the voltage $E_5$.

Figure 11:
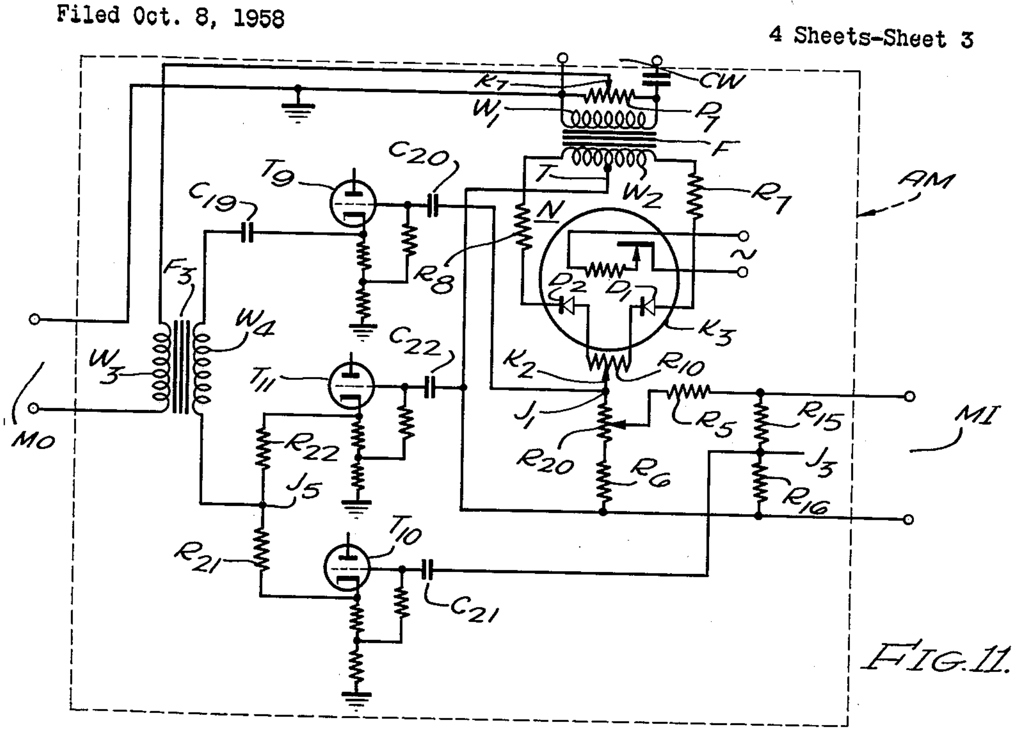
Fig. 11 is a wiring diagram of an amplitude modulator employed in this invention.

The amplitude modulator AM of Fig. 11 employs a potential divider in the form of two resistors $R_5$ and $R_6$ connected in series across the input MI. A carrier wave having an amplitude $E_1$ is applied from the output O of the main amplifier channel MA to the primary winding $W_1$ of a transformer F which is connected at the input CW. The center tap T of the secondary winding $W_2$ of transformer F is grounded. Two resistors $R_7$ and $R_8$ are connected in series with a pair of diodes $D_1$ and $D_2$ across the secondary winding $W_2$ of the transformer F. The secondary winding $W_2$, the resistors $R_7$ and $R_8$, and the diodes $D_1$ and $D_2$ form a symmetrical balanced network or bridge N with respect to a junction $J_1$ between the two resistors $R_5$ and $R_6$. The balanced network N forms, in effect, a variable resistance which shunts the resistor $R_6$. In practice, the voltage appearing across each half of the transformer winding $W_2$ exceeds any voltage that may be impressed on the resistor $R_6$ from the modulator input MI. The two diodes $D_1$ and $D_2$ are mounted in a thermostatically controlled case $K_3$ in order to maintain the temperature of the two diodes $D_1$ and $D_2$ substantially constant, even though the apparatus is exposed to different ambient temperatures. When the voltage across the secondary winding $W_2$ is of one polarity, a large current flows in the "forward" direction to the two diodes $D_1$ and $D_2$ and their resistances are low, thus providing a nearly zero resistance or a short circuit shunting the resistor $R_6$. But when the voltage appearing across the secondary winding $W_2$ is of the opposite polarity, substantially no current flows in the "backward" direction through the two diodes $D_1$ and $D_2$ and a very large resistance shunts the output resistor $R_6$. Thus, in effect the network N provides switching means which periodically shorts the resistor $R_6$.

A balancing resistor $R_{10}$ is connected between the two diodes $D_1$ and $D_2$ and the junction $J_1$ is connected to a moving contact $K_2$ which is adjustably movable along the potential divider $R_{10}$ to balance the amplitude modulator. The output MO of the amplitude modulator AM is supplied in part from a secondary winding $W_3$ of a transformer $F_3$ and in part from a potential divider $P_7$ that is connected across the primary winding $W_1$ of the carrier wave input transformer F. One end of the primary winding $W_4$ of the output transformer $F_3$ is connected through a coupling capacitor $C_{19}$ to the output of a cathode loaded coupling tube $T_9$ which in turn is connected through a coupling capacitor $C_{20}$ to the junction $J_1$. The other terminal of the primary winding $W_4$ is connected to the junction $J_5$ between two equal resistors $R_{21}$ and $R_{22}$ which are connected to the outputs of two cathode follower tubes $T_{10}$ and $T_{11}$ respectively. The input circuit of one of the cathode follower tubes $T_{10}$ is connected through the coupling capacitor $C_{21}$ to the junction $J_3$ between the resistors $R_{15}$ and $R_{16}$ and the input of the other cathode follower tube $T_{11}$ is connected to the other end of the resistor $R_{16}$ through the coupling capacitor $C_{22}$.

With this arrangement, all of the parts of the circuit, including the resistors $R_5$, $R_6$, $R_{15}$, and $R_{16}$ which are connected to the modulator input MI are isolated from ground by means of the coupling capacitors $C_{20}$, $C_{21}$, and $C_{22}$. For this reason the signal source SS which is employed for supplying signals to the input MI may float, that is they may be maintained at a voltage different from ground and may even be floating at a variable voltage with respect to ground without interfering with the proper operation of the amplitude modulator AM.

With this modulator as more fully explained in the aforesaid co-pending Wiancko et al. patent application, a square wave appears across the primary winding $W_3$ of the output transformer $F_3$. This square wave has the same fundamental frequency as the alternating current that is impressed upon the carrier wave input CW of the amplitude modulator but the amplitude of this square wave is substantially proportional to the voltage supplied to the input MI from the signal source SS. By adjusting the contact $K_7$ of the potentiometer $P_7$, the voltage appearing at the output MO is made equal to zero at a voltage in the middle of the range of amplitudes of input signal. Thus, if the modulator is to be used to frequency modulate the output of oscillator over a range of input signal amplitudes between 0 volts and 5 volts, the contact $K_7$ is adjusted to produce zero voltage at the output MO of the amplitude modulator AM when a voltage of 2.5 volts is impressed upon the input MI of the amplitude modulator. As more fully explained in said Wiancko et al. co-pending application, the wave appearing at the output MO is symmetrical about the zero voltage axis. For this reason, low frequency signals of the same frequency as the modulating signals impressed upon the input MI are balanced out and hence are not transmitted to the input $I_3$ of the adder AD.

With the winding $W_3$ appropriately connected, the frequency of the oscillator increases when the voltage applied to the input MI increases and decreases when the voltage applied to the input MI decreases.

Figure 1:
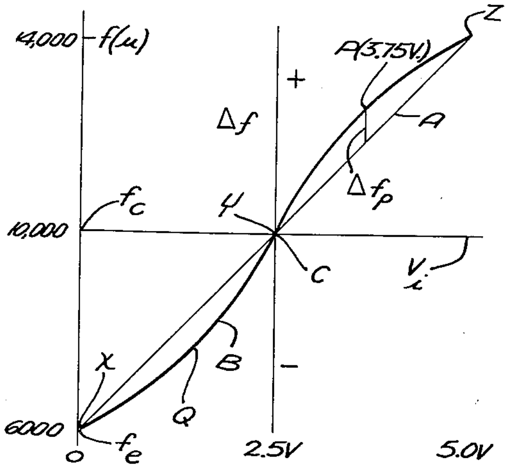
Figs. 1 and 2 are graphs employed in explaining the basic problem which is solved in accordance with this invention.

Were it not for the presence of the attenuator network AF, the frequency of the output signal of the oscillator would vary in the manner indicated by curve B of Fig. 1 when the circuit is adjusted to produce centered three-point linearity in which $f_1$=6,000 c.p.s., $f_c$=10,000 c.p.s. and $f_u$=14,000 c.p.s. By inserting an attenuation network AF of the type described, a much higher degree of linearity can be obtained. Thus in a particular case, the linearity error without the attenuation network AF was about 2%, but after insertion of the attenuation network AF, the linearity error was reduced to less than .3 of 1% of full scale. Though this may not appear to be a significant number when one merely considers these numbers as percentages, the reduction of the linearity error is actually about 85%. In any event, where a high degree of linearity is required as in many telemetering applications, the reduction of the deviation from linearity achieved by means of this invention is very significant and important.

Figure 12:
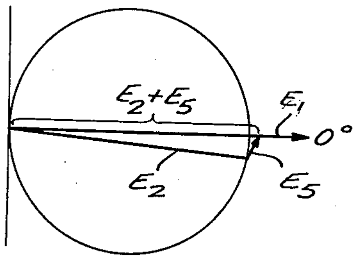
Fig. 12 is a vector diagram employed in explaining the action of the adder.

To facilitate an understanding of the principle of operation of the invention, reference is made to Fig. 12. In this figure, the vector $E_1$ representing the output of the amplifier channel MA is used for a reference. $E_2$ represents the voltage impressed on the input $I_2$ of the adder AD and $E_5$ represents the voltage impressed on the input $I_3$ of the amplifier channel MA and hence the clipper CL is the vector sum of $E_2$ and $E_5$. By the use of the clipper CL, this voltage is reduced to a constant value so that when it is amplified by the amplifier $A_1$, the required constant voltage $E_1$ is produced at the output $O_1$ of the amplifier $A_1$. When a given voltage such as a voltage of 3.75 volts is impressed on the input MI, an alternating current signal of a certain frequency appears at the output OP of the oscillator. If the frequency error or deviation from linearity is positive when the input signal is above average and is negative when the input signal is below average, as illustrated by the positions of the points P and Q of Fig. 1, compensation for such frequency deviation may be achieved in accordance with this invention by reducing the amplitude of the signal fed back through the auxiliary amplifier network $FB_2$ when the input voltage E is above average, and increasing the amplitude of the signal fed back through the auxiliary feedback network when the input voltage is below average, but without destroying the centered three-point linearity characteristic. In accordance with this invention, the linearity of the output is improved in that and similar cases throughout the entire range of amplitudes of the input signal by employing a band discriminating circuit AF in the auxiliary feedback circuit $FB_2$, in which the transmission coefficient is made a nearly parabolic function of input voltage. In its simplest form, the band discriminating circuit is a linear passive network which possesses the desired frequency-versus-amplitude characteristic. In such a band discriminating circuit AF as the frequency of the signal transmitted therethrough changes, the phase shift, as well as the transmission coefficient, also changes. However, if we neglect the phase shift and take into account the fact that this is not the dominating factor in making the correction, some understanding of how the S-shape of the output curve B is removed or at least greatly reduced can be understood by reference to Figs. 13, 14 and 15.

Figure 13:
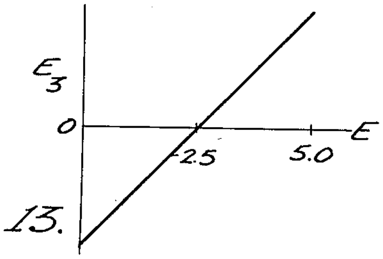
Figs. 13 to 16 are graphs employed in explaining the action of the amplitude discrimination network of this invention.

The graph of Fig. 13 represents how the amplitude appearing at the output of the amplitude modulator AM varies as a function of the input voltage E, if the output is a perfectly linear function of the input voltage and the output is zero when the input signal is 2.5 volts. The graph of this figure is represented by the formula:

$$E_3=c(E-2.5)$$

Over a substantial range, the attenuation characteristic of the attenuation network AF, can be represented approximately by the formula for a parabola. Thus the transmission coefficient is $$T_4=a+b(E-2.5)^2$$

Figure 14:
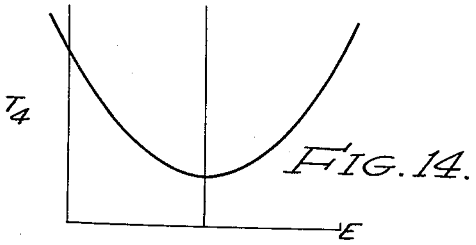

A graph of such a parabola is illustrated in Fig. 14.

Figure 15:
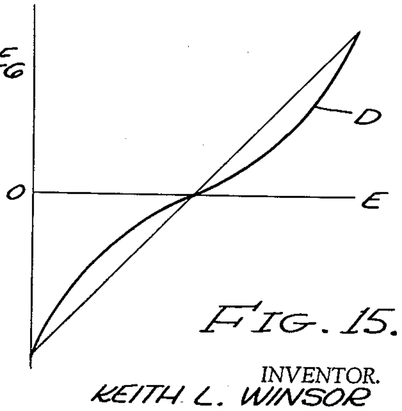

When the output of an amplitude modulator having the characteristic such as that illustrated in Fig. 13 is transmitted through an attenuation network AF, having a characteristic such as that illustrated in Fig. 14, the output $E_6$ of the attenuation network AF varies as a function of the input voltage E somewhat in the manner indicated in Fig. 15 by the graph D. It is to be noted here that the deviations of this curve from linearity are in the opposite direction from the deviations from linearity exhibited by the graph B of Fig. 1. By employing an attenuation network having a characteristic somewhat like that of Fig. 14, signals can be fed back to the input of the adder which provide corrections which compensate to some extent at least for deviations from linearity that would otherwise occur in the output OP of the oscillator.

The foregoing analysis is not complete since it does not take into account the fact that the filter AF produces variable phase shifts and the further fact that the signal $E_5$ varies in phase relative to the signal $E_1$. In practice it is found that excellent compensation and great improvement of linearity can be achieved by employing a Wien network such as that illustrated in Fig. 9 by setting the natural frequency of the network, that is the frequency at which the minimum transmission occurs, at a frequency above the center frequency $f_c$ of the frequency range of the oscillator. In practice, rather than try to compute the exact value of this frequency and the exact characteristics of the filter required for best compensation, various elements in the networks are made variable and they are adjusted empirically to produce improved results compared with those otherwise obtainable when the attenuation network AF is omitted.

Figure 2:
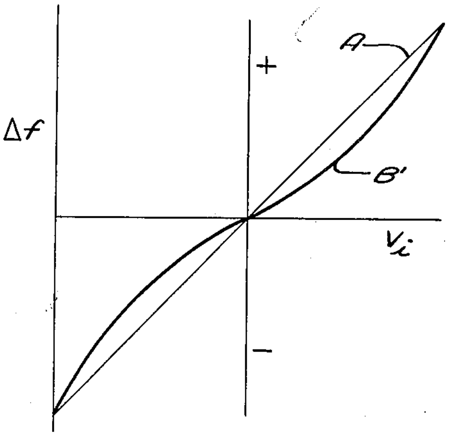
Figure 16:
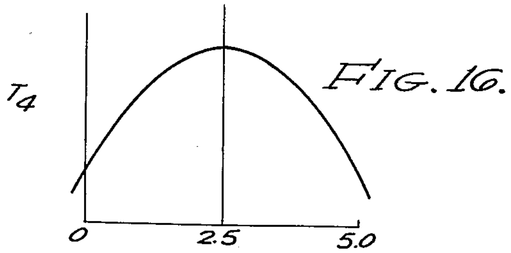

It is interesting to note that if the curvature of the graph B shown in Fig. 1 were to be reversed so as to achieve a characteristic such as that represented by the graph B′ of Fig. 2, then for optimum results the characteristic of the attenuation network should be reversed so as to have a characteristic such as that illustrated in Fig. 16 in order to achieve the desired compensation. In any event, it is found experimentally that for improved results, the extreme attenuation, that is maximum or minimum attenuation of the network, should usually be at a frequency within the frequency range over which the oscillator is to be operated but above the under frequency and the transmission coefficient should change monotonically in the same sense on opposite sides of that frequency. In other words, if the extreme attenuation value corresponds to minimum transmission, then the transmission coefficient should increase as the frequency difference increases regardless of whether the difference is due to a decrease or to an increase in frequency. Likewise, if the extreme attenuation value corresponds to a maximum transmission, then the transmission coefficient should decrease as the frequency difference increases, regardless of whether the difference is due to a decrease or an increase in frequency. For convenience, the frequency at which this extreme transmission coefficient occurs is sometimes referred to herein as the extreme-transmission frequency $f_e$.

In the explanation, it has been assumed that the transmission coefficient varies a quadratic or parabolic function of frequency. However it is not intended to restrict the invention to such an exact formula since the exact shape of the curve to be employed to achieve optimum results varies greatly according to circumstances.

In the specific embodiment of the invention described, the extreme transmission coefficient, in this case the maximum transmission coefficient, of the filter AF was at a frequency of 12 kc.p.s. In the neighborhood of that frequency, the attenuation characteristic is parabolic. However, as is clear from examining Fig. 10, there is actually very little change in the amplitude of the network at higher frequencies though there is a large change at lower frequencies. It is thus apparent that even though the invention has been described with reference to a theoretically feasible characteristic, the actual characteristics that may be employed in practice to achieve optimum compensation and hence more accurate linearity of output frequency as a function of input voltage of the frequency modulated oscillator, may take a wide variety of forms.

In the best embodiment of the invention now known, the two resistors $R_1$ and $R_2$ of the first phase-shift network $P_2$ are made variable and the resistors $R_3$ and $R_4$ of the other phase-shift network $P_2$ are made variable. The resistors $R_1$, $R_2$ and $R_3$ are ganged together. As the resistors $R_1$ and $R_2$ are varied, the frequency of oscillation corresponding to no signal being fed back through the second-phase shift network $PS_2$, that is the center frequency $f_c$, is varied by the change in the values of the resistors $R_1$ and $R_2$. Simultaneously, the value of the resistor $R_3$ is changed in such a way that the phase shift to which any signals that might be transmitted through the second phase-shift network $PS_2$ at that same frequency are subjected in their passage therethrough, is constant. In other words, the natural frequency of oscillation corresponding to an input signal E of 2.5 volts is varied by changing the values of the resistors $R_1$ and $R_2$ of the first phase-shift network. But in spite of the change in the center frequency $f_c$, the phase shift introduced in the second phase-shift network $PS_2$ at the center frequency remains constant.

Though there are numerous ways of adjusting the circuit for optimum results, one way to achieve a high degree of linearity is briefly described as follows:

*Step 1.*—Short out the auxiliary feedback circuit as by closing a normally open switch $S_1$ in the output of the attenuation network AF. While this switch is closed, adjust the values of the ganged resistors $R_1$, $R_2$ and $R_3$ to set the frequency at its desired center value. Then open the switch $S_1$.

*Step 2.*—With no voltage supplied to the input MI, adjust the potentiometer $P_7$ in the amplitude modulator to set the frequency at a selected lower-limit value $f_1$.

*Step 3.*—Apply a signal having the maximum amplitude such as 5 volts to the input MI through the input attenuator AT. Adjust the attenuation of the input attenuator AT to a point such that the frequency generated by the oscillator has its upper limit value $f_u$ such as 14 kc.p.s.

*Step 4.*—Apply the middle voltage of 2.5 volts and observe the frequency generated. If this frequency differs from the center frequency produced in Step 1, adjust the value of resistor $R_4$ to increase this difference by a factor of about 2 or 3.

*Step 5.*—Repeat the sequence beginning with Step 1 until no further improvement in linearity is obtained.

For best results, and in any event, to assure that a high degree of linearity is obtained and that the upper-limit and lower-limit frequencies have the desired values and that centered three-point linearity is achieved, the foregoing sequence of steps may be repeated several times. In practice, though, it is found that the resistor $R_4$ may be set once and for all, at the factory, and that it is easy to select an arrangement of resistors $R_1$, $R_2$ and $R_3$ that are ganged and vary in proportion to each other to achieve the desired result and adjustment of center frequency $f_c$ with a minimum effort. More particularly, the resistor $R_1$ may comprise two resistors $R_1'$ and $R_1''$ in series, namely a 5 kω fixed resistor and a 2.5 kω variable resistor; and the resistor $R_2$ may comprise two resistors $R_2'$ and $R_2''$ in series, namely, a 10 kω resistor and a variable 5 kω resistor; and the resistor $R_3$ may comprise two resistors $R_3'$ and $R_3''$ connected in series, namely a 2 kω fixed resistor and a 0.5 kω variable resistor. The three variable resistors are linear and their resistances vary in proportion to each other under the control of a single common knob H (see Fig. 3). With such an arrangement, once the frequency modulated oscillator has been set to provide centered three-point linearity, the three ganged resistors $R_1$, $R_2$ and $R_3$ may be varied together to vary the center frequency $f_c$ without destroying three-point linearity.

With the frequency modulated oscillator described above, the circuits that control the center frequency without destroying three-point linearity and the circuits which reduce the linearity errors operate substantially independently of each other. This independence arises from two features. First of all, the second phase-shift network $PS_2$ and the amplitude discriminating network are isolated from each other by the feedback amplifier $A_2$. In addition, the two circuits have entirely different kinds of phase-shift characteristics. The phase-shift circuit $PS_2$ introduces a phase shift which is large and approaching quadrature relative to the phase shift introduced by the first phase-shift network $PS_1$. In fact, over the frequency range of oscillation between 6 kc.p.s. and 14 kc.p.s., the difference in phase shift between the two phase-shift networks $PS_1$ and $PS_2$ varies from about 55° to about 78°. On the other hand, the phase shift introduced by the amplitude discriminating network AF is very small. In fact, in the particular frequency modulated oscillator described above, the phase shift introduced by the amplitude discriminator AF varies from about 3° to about 16° over the entire range of frequencies at which the oscillator is designed to operate. By virtue of these facts, the relative amplitudes of signals that are transmitted at different frequencies through the auxiliary feedback network $FB_2$ may be altered without greatly changing the relative phase that would otherwise exist between the two signals that are impressed upon the inputs $I_2$ and $I_3$ of the adder AD. Thus, the second phase-shift network constitutes means for varying the phase in the second feedback network as a function of frequency while maintaining the phase difference between the phase shifts introduced by the two phase-shift networks $PS_1$ and $PS_2$ at a large electrical angle, and the amplitude discriminating network AF constitutes means for varying the amplitude of the signal fed back as a function of frequency without substantially shifting the phase of the signals fed back through the auxiliary feedback amplifier $FB_2$.

Figure 17:
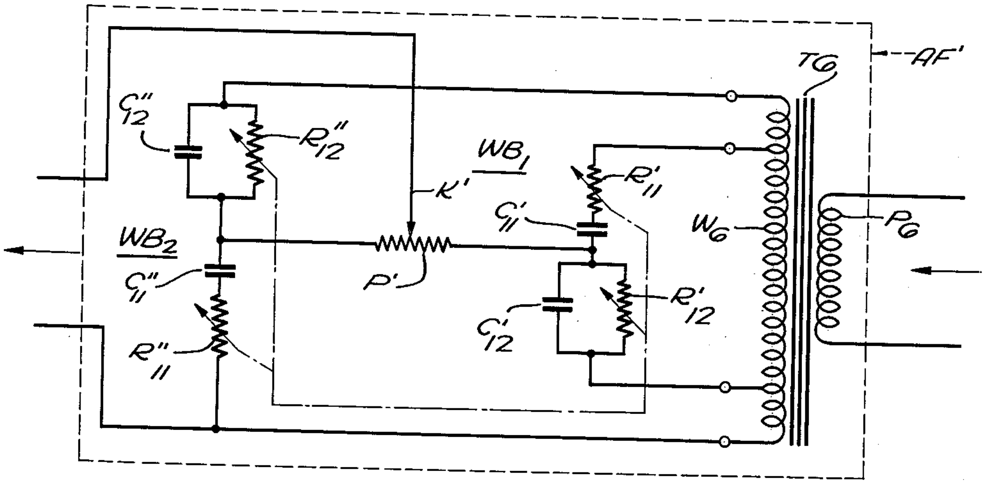
Fig. 17 is a wiring diagram of an adjustable band discriminating filter employed in this invention.

In Fig. 17 there is illustrated an adjustable band-discriminating network which may be employed to introduce corrections of varying magnitudes. The attenuation network AF′ there illustrated comprises a pair of Wien bridge circuits $WB_1$ and $WB_2$ connected in parallel across different portions of a secondary winding $W_6$ of a transformer $T_6$ the primary winding $P_6$ of which is connected to the output of the amplitude modulator AM. The first Wien bridge $WB_1$ is connected across a low voltage winding section of the secondary winding $W_6$ and the other Wien bridge $WB_2$ is connected across a large winding section of the secondary winding W. The two Wien bridges $WB_1$ and $WB_2$ are tuned to the same resonant frequency; that is, the frequency at which zero phase shift and extreme attenuation occurs.

The first Wien bridge $WB_1$ comprises a series resistor $R_{11}'$ and a series capacitor $C_{11}'$ connected in one arm of the bridge and also a resistor $R_{12}'$ and a capacitor $C_{12}'$ connected in parallel in the other arm. The second Wien bridge $WB_2$ comprises a series resistor $R_{11}''$ and a series capacitor $C_{11}''$ connected in one arm of the bridge and also a resistor $R_{12}''$ and a capacitor $C_{12}''$ connected in parallel in the other arm.

The two Wien bridges $WB_1$ and $WB_2$ are oppositely connected so that, in effect, the series branch of one and the shunt branch of the other are connected to one common end of the secondary winding $W_6$, and the shunt branch of the one and the series branch of the other are connected to the other end of the secondary winding $W_6$.

A potentiometer P′ having a sliding contact K′ is connected between the center points of the two bridges $WB_1$ and $WB_2$. The output of the network appears across the contact K′ and the end of the bridge $WB_2$ in which the series resistor $R_{11}''$ and the series capacitor $C_{11}''$ are connected. The resistors $R_{11}'$, $R_{12}'$, $R_{11}''$ and $R_{12}''$ are ganged together so that the phase shift introduced in each branch of each bridge is the same at the resonant frequency. With this arrangement, the resonant frequency of each of the Wien bridge circuits $WB_1$ and $WB_2$ is the same.

Figures 18, 19, 20:
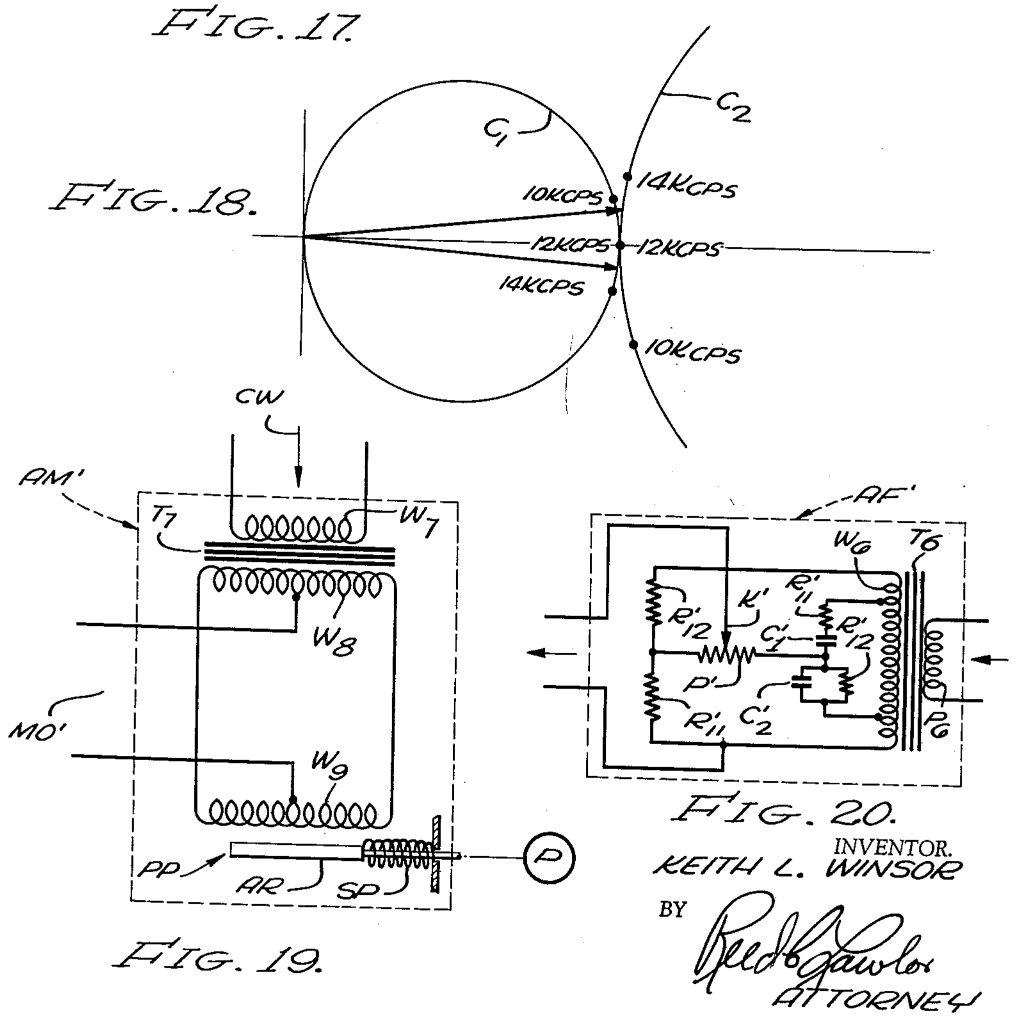
Fig. 18 is a polar diagram employed in explaining the characteristics of the band discriminating filter of Fig. 17.
Fig. 19 is a wiring diagram of an alternative form of amplitude modulator employed in this invention.
Fig. 20 is a wiring diagram of an alternative form of adjustable band discriminating filter.

The characteristic of the band discrimination network of Fig. 17 may be understood by reference to Fig. 18. In that figure, the circle $C_1$ is the polar diagram that represents the characteristic of the first Wien bridge $WB_1$ and the circle $C_2$ is the polar diagram representing the characteristic of the second Wien bridge circuit $WB_2$. Here, it will be noted that the first bridge circuit $WB_1$ has a maximum transmission coefficient at 12 kc.p.s. and the second Wien bridge circuit has a minimum transmission coefficient at 12 kc.p.s. The characteristic of the combined network depends upon the location of the contact K′ on the potentiometer P′. When the contact K′ is at the end of the potentiometer $P_1$ connected to the center of the first Wien bridge $WB_1$, the transmission characteristic of the network AF′ is that represented by the circle $C_1$, but when the contact K′ is at the other end of the potentiometer P′ at the center of the second bridge $WB_2$, the characteristic of the network is represented by the circle $C_2$. At least this is the case so long as the resistance of the potentiometer P′ is large compared with the impedance of either of the Wien bridges $WB_1$ and $WB_2$. When the contact K′ is at some intermediate point, the characteristic is different from that of either Wien bridge alone, but is a composite characteristic.

By movement of the contact K′ the curvature of the amplitude versus frequency characteristic may be altered without changing the extreme frequency of 12 kc.p.s. When the contact K′ is at one end of the bridge circuit, the band-pass characteristic resembles that illustrated in Fig. 13, but when it is at the other end of the potentiometer P′, it resembles that of Fig. 16, thus, by movement of the contact K′ the curvature of the characteristic may be changed from a high value in a positive direction to a high value in a negative direction and curvatures of any intermediate values may be obtained.

Various other types of adjustable circuits may be employed, for example, the two bridges $WB_1$ and $WB_2$ may both be connected across the same part of the secondary winding $W_6$. Also, the two bridges may be of a different character, so long as the two bridges have different frequency versus amplitude characteristics. For example, an adjustable band discriminating network may be produced by employing the first bridge $WB_1$ as shown and by altering the second bridge $WB_2$ by removing the condenser $C_{12}''$ and by short-circuiting the condenser $C_{11}''$ as indicated in Fig. 20.

It is extremely useful to have available an adjustable band discriminating network such as that illustrated in Figs. 17 or 20, where a series of frequency modulated oscillators are being manufactured which have somewhat different non-linearity characteristics. Such differences may arise because of slight differences in the components employed. This is especially the case where the amplitude modulator AM is of a type in which the output of the modulator depends upon some mechanical force applied thereto.

In Fig. 19, an amplitude modulator of the latter type is shown. In this case, a primary winding $W_7$ of a transformer $T_7$ is connected at the input of the amplitude modulator AM′. The secondary winding $W_8$ forms one branch of a Wheatstone-type bridge circuit, while the variable reluctance winding $W_9$ of a pressure pickup PP forms the other branch. The output MO′ of the amplitude modulator is connected to a pair of diagonally opposite points of the Wheatstone-type bridge formed by the windings $W_8$ and $W_9$. In such a pickup, a movable armature AR associated with the winding $W_9$ is moved against the force of a spring SP by a distance depending upon the pressure detected by a pressure sensitive element P. Many devices of this kind are well known in the prior art and also many others that respond to other kinds of control forces. In such a device, the amplitude of the carrier wave appearing across the output MO′ depends upon the displacement of the armature AR and hence the magnitude of the pressure or other force that produces the displacement of the armature. Where a frequency modulated oscillator of the type hereinabove described is to be employed with different pressure pickups PP which have slightly different characteristics and which therefore produce slightly different deviations of the response characteristic of the oscillator from the desired linear characteristic, the provision of an adjustable band discriminating network such as that illustrated in Fig. 17 or Fig. 18 is very beneficial.

Though the invention has been described with reference to only a few specific embodiments thereof which are illustrated and described herein, it will be understood that the invention may be applied in many other ways. Furthermore, even though the invention has been described with reference to an amplitude modulator that is modulated by a unilateral voltage and one that is modulated by a unilateral pressure, it will be understood that it is applicable when amplitude modulators that respond to other control forces are used. It is therefore to be understood that the invention is not limited to the specific embodiments thereof which have been illustrated and described herein, but may be embodied in many other forms within the scope of the appended claims.

This invention claimed is:

1. In a frequency modulated oscillator of the type which employs two out-of-phase feedback circuits, each of which is connected between the output and the input of an amplifier and in which the oscillator output frequency varies as a function of the amplitude of a control force, and in which the output oscillator frequency varies over a predetermined range of frequency values corresponding to a predetermined range of amplitudes of said control force, the combination of:

a main amplifier having an input and an output;

a first feedback circuit including a first phase-shift network for feeding an output signal from the main amplifier output to the input of said main amplifier with a phase relative to the signal at the input of said main amplifier that varies in accordance with the frequency of said output signal;

an amplitude modulator controlled by the amplifier output signal and by said control force for generating an amplitude modulated signal that has an amplitude that is modulated in accordance with the magnitude of said control force; and means including a second phase-shift circuit, and an auxiliary amplifier, and an amplitude discriminating network connected with said amplitude modulator to form a second feedback circuit connecting the output of said main amplifier to the input thereof, said second feedback network applying said amplitude modulated signal to said input with a phase that varies in accordance with the frequency of said output signal;

the phase-shift characteristics of said two feedback means being such that the two signals applied to said input are out of phase with each other by a large electrical angle;

said amplitude discriminating network having a transmission coefficient that varies with frequency over said frequency range and having a phase-shift characteristic in which the phase shift is small over said frequency range, whereby the frequency generated by said oscillator is very nearly a linear function of said control force.

2. In a frequency modulated oscillator of the type which employs two out-of-phase feedback circuits, each of which is connected between the output and the input of an amplifier and in which the oscillator output frequency varies as a function of the amplitude of a control force, and in which the output oscillator frequency varies over a predetermined range of frequency values corresponding to a predetermined range of amplitudes of said control force, the combination of:

a main negative feedback amplifier having an input and an output;

adding means for feeding the vector sum of two signals to the amplifier input;

signal clipping means connected between said adding means and said negative feedback amplifier for reducing the amplitude of signals fed from said adding means to the input of said main negative feedback amplifier throughout said frequency range;

a first feedback circuit including a first phase-shift network for feeding an output signal from the main amplifier output to said adding means with a phase relative to the signal at the input of said main amplifier that varies in accordance with the frequency of said output signal;

an amplitude modulator controlled by the amplifier output signal and by said control force for generating an amplitude modulated signal that has a frequency equal to the frequency of said output signal and having an amplitude that is modulated in accordance with the magnitude of said control force;

means including a second phase-shift circuit and an auxiliary negative feedback amplifier, and an amplitude discriminating network connected with said amplitude modulator to form a second feedback circuit connecting the output of said main amplifier to said adding means, said second feedback network applying said amplitude modulated signal to said adding means with a phase that varies in accordance with the frequency of said output signal;

the phase-shift characteristics of said two feedback means being such that the two signals applied to said input are out of phase with each other by a large electrical angle;

said amplitude discriminating network having a transmission coefficient that varies with frequency over said frequency range and having a phase shift characteristic in which the phase shift is small over said frequency range, whereby the frequency generated by said oscillator is very nearly a linear function of said control force.

3. A frequency modulated oscillator as defined in claim 1 comprising:

means for simultaneously adjusting the characteristic of said first phase-shift network and said second phase-shift network to vary the center frequency of said oscillator and for simultaneously varying the phase shift introduced by said second phase-shift circuit to maintain the phase shift introduced by said second phase-shift circuit constant at said center frequency as said center frequency is changed.

4. A frequency modulated oscillator as defined in claim 1 comprising:

switching means for temporarily rendering said second feedback circuit inoperative whereby no signals are fed back to said adding means through said second feedback circuit; and means for supplying an adjustable amount of the signal from said main amplifier output to the output of said amplitude modulator to establish at a selected value the frequency of oscillation corresponding to a predetermined value of said control force.

5. A frequency modulated oscillator as defined in claim 4 comprising:

means for adjusting the magnitude of the signal produced by said amplitude modulator in response to a predetermined control force for altering the range of oscillator frequency that corresponds to a predetermined range of amplitudes of said control force.

6. In a frequency modulated oscillator of the type which employs two out-of-phase feedback circuits, each of which is connected between the output and the input of an amplifier and in which the oscillator output frequency varies as a function of the amplitude of a control force, and in which the output oscillator frequency varies over a predetermined range of frequency values corresponding to a predetermined range of amplitudes of said control force, the combination of:

a main amplifier having an input and an output;

a first feedback circuit including a first phase-shift network for feeding an output signal from the main amplifier output to the input of said main amplifier with a phase relative to the signal at the input of said main amplifier that varies in accordance with the frequency of said output signal;

an amplitude modulator controlled by the amplifier output signal and by said control force for generating an amplitude modulated signal that has an amplitude that is modulated in accordance with the magnitude of said control force; and means including a second phase-shift circuit, and an auxiliary amplifier and a band discriminating network connected with said amplitude modulator to form a second feedback circuit connecting the output of said main amplifier to the input thereof, said second feedback network applying said amplitude modulated signal to said input with a phase that varies in accordance with the frequency of said output signal;

said band discriminating network including means for varying the curvature of the frequency versus amplification characteristic thereof;

the phase-shift characteristics of said two feedback means being such that the two signals applied to said input are out of phase with each other by a large electrical angle;

said band discriminating network having a transmission coefficient that varies with frequency over said frequency range and having a phase-shift characteristic in which the phase shift is small over said frequency range, whereby the frequency generated by said oscillator is very nearly a linear function of said control force.

7. In a frequency modulated oscillator of the type which employs two out-of-phase feedback circuits, each of which is connected between the output and the input of an amplifier and in which the oscillator output frequency varies as a function of the amplitude of a control force, and in which the output oscillator frequency varies over a predetermined range of frequency values corresponding to a predetermined range of amplitudes of said control force, the combination of:

a main amplifier having an input and an output;

a first feedback circuit including a first phase-shift network for feeding an output signal from the main amplifier output to the input of said main amplifier with a phase that varies in accordance with the frequency of said output signal;

an amplitude modulator controlled by the amplifier output signal and by said control force for generating an amplitude modulated signal that has an amplitude that is modulated in accordance with the magnitude of said control force; and means including a second phase-shift circuit and an auxiliary amplifier connected with said amplitude modulator to form a second feedback circuit connecting the output of said main amplifier to said adding means, said second feedback network applying said amplitude modulated signal to said adding means with a phase that varies in accordance with said output signal frequency;

the phase-shift characteristics of said two feedback means being such that the two signals applied to said adding means are out of phase with each other by a large electrical angle; and means for simultaneously adjusting the characteristic of said first phase-shift network and said second phase-shift network to vary the center frequency of said oscillator and for simultaneously varying the phase shift introduced by said second phase-shift circuit to maintain the phase shift introduced by said second phase-shift circuit constant at said center frequency as said center frequency is changed.

8. In a frequency modulated oscillator of the type which employs two out-of-phase feedback circuits, each of which is connected between the output and the input of an amplifier and in which the oscillator output frequency varies as a function of the amplitude of a control force, and in which the output oscillator frequency varies over a predetermined range of frequency values corresponding to a predetermined range of amplitudes of said control force, the combination of:

a main amplifier having an input and an output;

a first feedback circuit including a first phase-shift network for feeding an output signal from the main amplifier output to the input of said main amplifier with a phase that varies in accordance with the frequency of said output signal;

an amplitude modulator controlled by the amplifier output signal and by said control force for generating an amplitude modulated signal that has an amplitude that is modulated in accordance with the magnitude of said control force; and means including a second phase-shift circuit and an auxiliary amplifier connected with said amplitude modulator to form a second feedback circuit connecting the output of said main amplifier to said adding means, said second feedback network applying said amplitude modulated signal to said adding means with a phase that varies in accordance with said output signal frequency;

the phase-shift characteristics of said two feedback means being such that the two signals applied to said adding means are out of phase with each other by a large electrical angle;

adjustable means for establishing a centered three-point linearity characteristic for the output frequency of said oscillator as a function of said control force; and means for simultaneously adjusting the characteristic of said first phase-shift network and said second phase-shift network to vary the center frequency of said oscillator and for simultaneously varying the phase shift introduced by said second phase-shift circuit to maintain the phase-shift introduced by said second phase-shift circuit constant at said center frequency as said center frequency is changed.

9. In a frequency modulated oscillator of the type which employs two out-of-phase feedback circuits, each of which is connected between the output and the input of an amplifier and in which the oscillator output frequency varies as a function of the amplitude of a control force, and in which the output oscillator frequency varies over a predetermined range of frequency values corresponding to a predetermined range of amplitudes of said control force, the combination of:

a main amplifier having an input and an output;

a first feedback circuit including a first phase-shift network for feeding an output signal from the output of said main amplifier to the input of said main amplifier with a phase that varies in accordance with the frequency of said output signal;

an amplitude modulator controlled by the amplifier output signal and by said control force for generating an amplitude modulated signal that has an amplitude that is modulated in accordance with the magnitude of said control force; and means including a second phase-shift circuit and an auxiliary amplifier connected with said amplitude modulator to form a second feedback circuit connecting the output of said main amplifier to the input thereof, said second feedback network applying said amplitude modulated signal to said input with a phase that varies in accordance with the frequency of said output signal;

the phase-shift characteristics of said two feedback means being such that the two signals applied to said input are out of phase with each other by a large electrical angle;

means included in said feedback circuits for establishing a centered three-point linearity characteristic for the output frequency of said oscillator as a function of said control force; and means for adjusting the center frequency of said oscillator while maintaining such a centered three-point linearity characteristic.

10. A frequency modulated oscillator as specified in claim 1 in which said amplitude discriminating network has an amplitude vs. frequency characteristic that has an extreme value within said predetermined range of frequency values and in which said transmission coefficient changes monotonically in the same sense on opposite sides of the frequency at which said extreme value of said characteristic occurs.

11. In a frequency-modulated oscillator of the type which employs two feedback circuits connected between the output and the input of an amplifier and in which the oscillator output frequency varies as a function of the amplitude of a control force over a predetermined range of frequency values corresponding to a predetermined range of amplitudes of said control force, the combination of:

a main amplifier having an input and an output;

adding means having two inputs and an output for producing at the output thereof a combined signal that is the vector sum of two signals fed to the respective inputs;

signal clipping means connected between said adding means and said main amplifier for supplying to the input of said main amplifier a signal of substantially constant amplitude when the amplitude of said combined signal exceeds a predetermined level;

a first feedback circuit for feeding an output signal from the main amplifier output to one input of said adding means, said main amplifier and said first feedback circuit shifting the phase of the signal that is transmitted from the input of said amplifier through said first feedback circuit to said adding means by an amount that varies in accordance with the frequency of said output signal;

an amplitude modulator controlled by the amplifier output signal and by said control force for generating an amplitude-modulated signal that has an amplitude that is modulated in accordance with the magnitude of said control force; and means including a phase-shift circuit, and an auxiliary amplifier, and an amplitude-discriminating network connected with said amplitude modulator to form a second feedback circuit connecting the output of said main amplifier to the other input of said adding means, said amplifier and said second feedback circuit shifting the phase of the signal that is transmitted from the input of said amplifier through said second feedback circuit to said second input of said adding means by an amount that varies in accordance with the frequency of said output signal, the two signals applied to said inputs through said two feedback circuits being out of phase with respect to each other by a large electrical angle, the sum voltage appearing at the output of said adding means exceeding said predetermined level, said attenuation network having a transmission coefficient that varies with frequency over said frequency range and having a phase-shift characteristic in which the phase shift is small over said frequency range, whereby the frequency generated by said oscillator is very nearly a linear function of said control force.

References Cited in the file of this patent

UNITED STATES PATENTS

| | | |
|---|---|---|
| 2,236,985 | Bartelink | Apr. 1, 1941 |
| 2,504,050 | Rodhe | Apr. 11, 1950 |
| 2,577,235 | Davidson | Dec. 4, 1951 |
| 2,814,020 | Bouwman et al. | Nov. 19, 1957 |